June 18, 1974 D. SPAHRBIER 3,817,792
ARRANGEMENT OF A FUEL CELL BATTERY
Filed March 27, 1972 4 Sheets-Sheet 2

United States Patent Office 3,817,792
Patented June 18, 1974

3,817,792
ARRANGEMENT OF A FUEL CELL BATTERY
Dieter Spahrbier, Frankfurt-Rodelheim, Germany,
assignor to Varta Batterie Aktiengesellschaft
Filed Mar. 27, 1972, Ser. No. 238,501
Claims priority, application Germany, Mar. 30, 1971,
P 21 15 310.6
Int. Cl. H01m 27/12, 31/00
U.S. Cl. 136—86 C    5 Claims

ABSTRACT OF THE DISCLOSURE

A fuel cell battery comprised of a plurality of separate battery units or elements, coordinated to each battery unit a unit storage tank for liquid fuel-electrolyte mixture and a forwarding system for the circulation of fuel-electrolyte mixture coordinated to each battery unit and unit storage tank combination.

All unit storage tanks are arranged separately of each other, such as in vertically stacked fashion, and connected by overflow tubes to permit cascading of the liquid fuel-electrolyte mixture successively through the unit storage tanks by gravity. Fresh fuel-electrolyte mixture is fed from a feed tank by a metering device to the uppermost of the unit storage tanks.

---

The present invention relates to an arrangement of a plurality of battery elements in a fuel cell battery for liquid fuel.

Fuel cell elements for liquid fuel are elements, which are operated with a mixture of an electrolyte and a liquid fuel, whereby the liquid fuel is oxidized electrochemically at the anode with the delivery of electrons.

Many fuels are suited for the electro-chemical oxidation, such as the liquid hydrocarbons and especially their water soluble derivatives, or the alcohols, such as methanol, ethanol or propanol. Also polyvalent alcohols, such as glycerol are useful as the liquid fuel. If desired, also inorganic fuels, which dissolve in the electrolyte and which are directly oxidized at a correspondingly catalytically activated anode, may be used. Examples of such useful inorganic fuels are hydrazine, alkaliboranates and ammonia.

When a consumer is connected to a fuel cell element for liquid fuel of the kind described, it can be observed that if a limited definite supply of the fuel-electrolyte mixture is provided at the beginning of the reaction, current and voltage gradually drop as the discharge of the cell proceeds.

The decrease of work output of the fuel cell element with time can be caused by a decrease of the concentration of the fuel in the reaction mixture, by the formation of intermediates, which are more difficult to oxidize or also by an increase of the concentration and the resistance polarization as a result of the accumulation of the reaction products in the electrolyte.

Fuel cell systems having the above described work output characteristics are in practice of minor importance. Generally, it is desired to provide fuel cell batteries, in which during operation the voltage U as well as the current J remain essentially constant. This can be achieved, for instance, by gradually increasing the effective surface of the electrodes in a fuel cell battery in order to compensate for the gradual decrease of the voltage caused by the gradual decrease of the concentration of the fuel in the fuel-electrolyte mixture. In practice one gradually switches into the circuit smaller battery units, for instance, with the help of an automatically operating cell switch. This permits to maintain the voltage and current essentially constant over the desired period of time. However, it requires complicated and complex devices, especially since one has to take into account the varying types of switching arrangements, such as arrangement of the cells in series or in parallel or in both arrangements. Thereby one has to consider not only the level of the desired voltage which is to be maintained constant, but also the effectiveness of the particular electrolyte fuel mixture used in each instance. This is especially true also for the sum of the voltages, which are a multiple of the voltage of an individual fuel cell elements, where the connecting electrical arrangements and the required cell element switches become especially complicated.

Furthermore, with this arrangement the later needed battery units must be connected to the circulatory system of the liquid fuel-electrolyte mixture and to the oxygen supply already at the beginning of the operation. This is required especially also in those cases where, during the operation, considerable variation in the work output requirements are encountered, so that addition or subtraction of individual battery units will be necessary for the stabilization of the voltage. In any event, with this kind of an arrangement, at an average there will be always a number of battery units of fuel cell elements which remain free from an electrical load at one time or another.

It is well known that the electrochemical properties and function of a fuel cell which is not under an electrical load, gradually deteriorate. This is particularly so if the fuel cell is maintained at a temperature higher than 25° C.

A further disadvantage of the above described operation of a fuel cell battery with a closed electrolyte circulation system resides in the fact that the catalyst of the fuel cell anodes cannot be adapted to the intermediates formed in the discharge cycles. It is known that a catalyst, which, for instance, is well suited for the reaction of methanol to form the formiate, is less suited for the reaction of the formiate to form the corresponding carbonate and vice versa. A catalyst, which performs well for the conversion of the formiate to the carbonate is less suited for the conversion of methanol to the formiate.

It is therefore an object of the invention to provide an arrangement of fuel cell battery elements, which does not have the above described disadvantages.

Other advantages will be apparent from the following description and from the attached drawings, wherein.

The objects of the invention are achieved by an arrangement which consists of a plurality of battery units, each arranged separately from the other, whereby each battery unit is provided with its own fuel-electrolyte tank, called herein unit storage tank and each battery unit storage tank combination is provided with its own fuel-electrolyte transport system. All unit storage tanks are arranged independently and separate from each other, and preferably the electrolyte tanks or unit storage tanks are connected by overflow tubes for cascading the fuel-electrolyte mixture by gravity successively through each of the unit storage tanks. An inlet for electrolyte fuel mixture with means for metering the amount is provided at at least one of the unit storage tanks.

Figure 1:
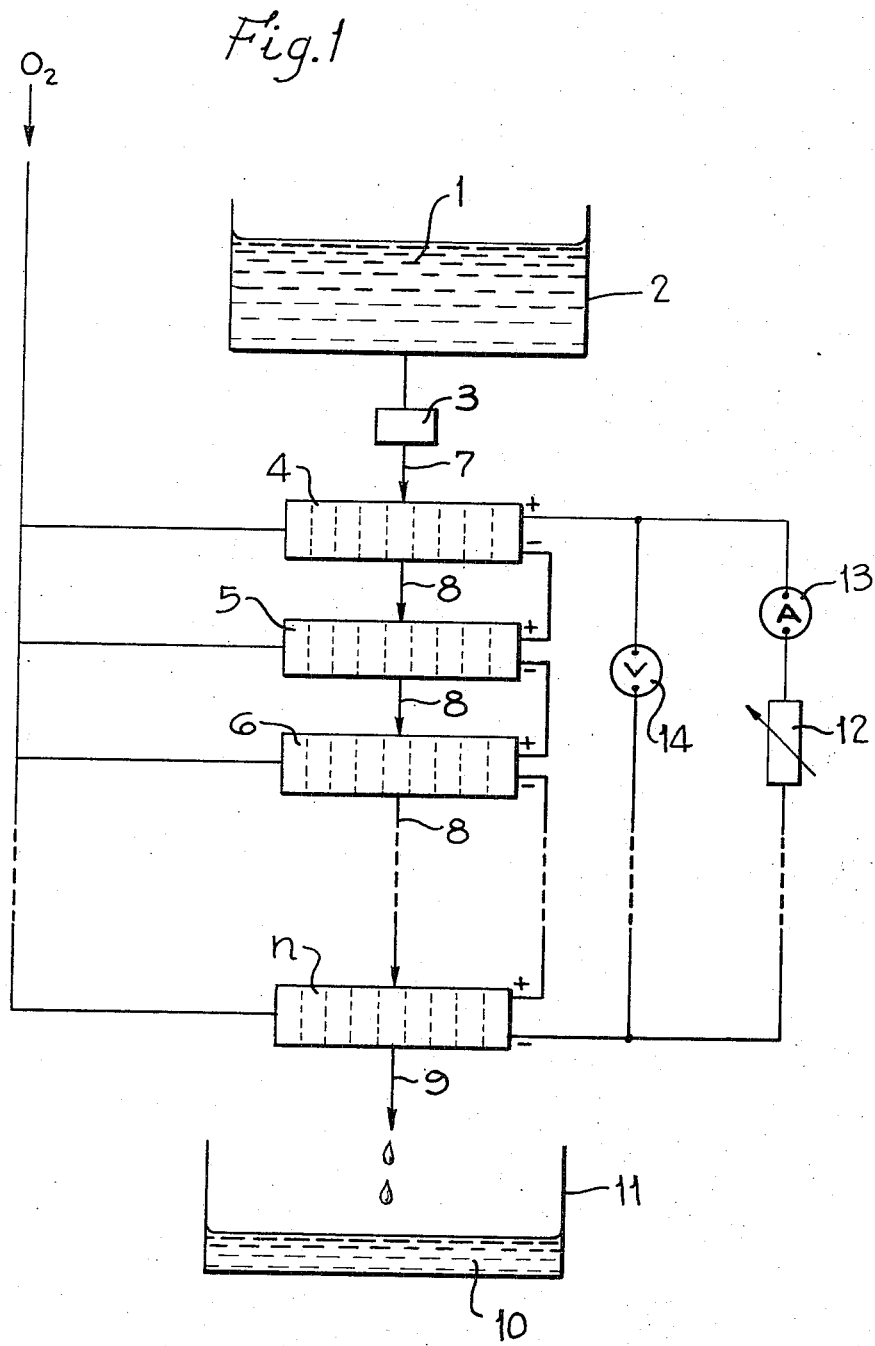
FIG. 1 is a schematical representation of an arrangement of a fuel cell battery in accordance with the invention.

A preferred embodiment of the arrangement of a fuel cell battery in accordance with the invention, comprising a plurality of separate battery units or elements and separate fuel-electrolyte tanks, is illustrated in FIG. 1. There, the battery units are arranged one above the other and the separate fuel-electrolyte or unit storage tanks are likewise arranged one above the other, the latter being connected communicatively to each other by overflow tubing as will be explained hereinafter in detail. An inlet with metering device is provided at the uppermost fuel-electrolyte tank for feeding fresh fuel-electrolyte mixture to the battery.

In the device in FIG. 1, the fuel-electrolyte mixture 1 is contained in feed storage container 2 and is fed in cascade like fashion to the stepwise arranged fuel cell element battery units 4 to $n$-number of units after it has passed metering device 3. Each of the fuel cell element battery units 4, 5, 6 to $n$ consists of a plurality of fuel cell elements, which may be connected electrically in parallel or in series as may be desired. The electrolyte spaces of each of the fuel cell element battery units are connected parallel to the flow of the fuel-electrolyte mixture. After passing the metering device 3 the fuel-electrolyte mixture is led over conduit 7 to the liquid cascade in measured amounts. The mixture flows through the connecting lines 8, passing successively each of the battery units 4, 5, 6 to $n$ and leaves the $n$th step or unit over conduit 9, from where it flows into container 11 to be collected therein as the exhausted fuel-electrolyte mixture 10.

The fuel cell element battery units 4, 5, 6 to $n$ may be connected electrically in parallel and/or in series. FIG. 1 shows the electrical connections in series. When consumer 12 is connected, ampere meter 13 indicates current J. The voltage of the fuel cell battery can be read at voltmeter 14. Under the conditions shown hereinbefore, electrochemical oxidation of the fuel and of its intermediates takes place successively and parallel in time in the $n$-steps or units of the battery. The oxidation begins in the first step and ends in the $n$th step of the battery. Under this conditions, the voltage $U_k$ of the fuel cell battery remains essentially constant at constant current consumption during the whole operating time, i.e. until all of the fuel-electrolyte mixture 1 has been completely consumed and passed through the battery. Furthermore, the current-voltage characteristic of the system remains the same independently of the current already consumed. A cell switch is not needed. A further advantage is that all cells of the fuel cell battery are electrically active during the whole duration of the operation. Thus, a reduction of the functioning ability, as it is observed with oxygen electrodes which are not operated, does not take place. Furthermore, the liquid cascade of the invention makes possible optimum catalytic activity of the fuel cell electrodes with respect to the intermediates formed in the reaction. This can be achieved, for instance, in the case of an alkaline methanol-oxygen fuel cell battery by providing the upper battery steps of the cascade with fuel cell anodes, which preferentially oxidize methanol to the formiate, while the lower steps of the battery cascade are provided with fuel cell anodes, which catalyze preferentially the oxidation of the formiate enriched in the last steps of the cascade to the corresponding carbonate.

Figure 2:
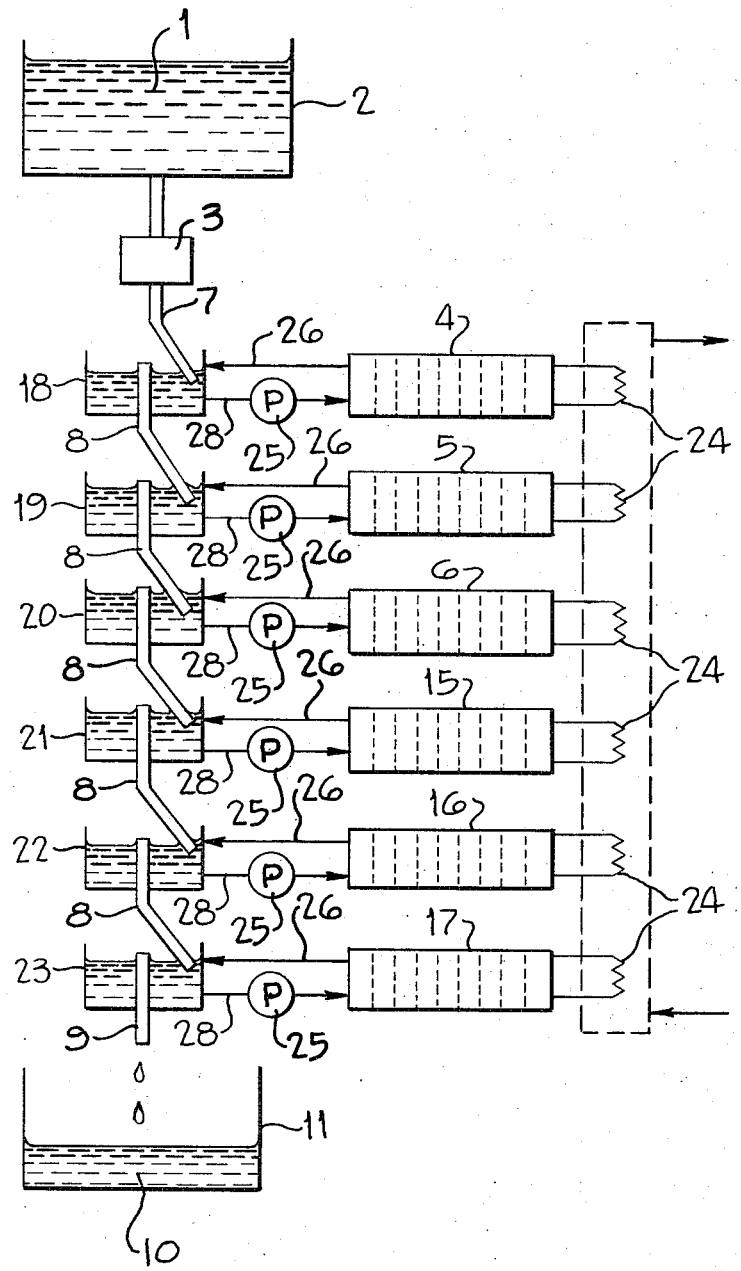
FIG. 2 illustrates in a schematical representation the stacked arrangement of a pluarlity of unit storage tanks for the fuel-electrolyte mixture and coordinated to each unit storage tank a fuel cell battery unit, including feed and overflow means for the unit storage tanks and heat exchange means for the individual fuel cell battery units.

FIG. 2 illustrates a fuel cell battery in which there is provided a liquid cascade of six steps for the supply of fuel-electrolyte mixture to the fuel cell elements and means for the removal of heat energy. Each of the battery units 24, 25, 26, 27, 28 and 29, respectively, is provided with its individual separate circulation system for the fuel-electrolyte mixture, each circulation system comprising unit storage tanks 18, 19, 20, 21, 22, and 23, respectively, a heat exchanger 36 for the removal of the heat loss, a circulatory pump 37 for the fuel-electrolyte mixture and lines 38 and 39 for the circulation of the fuel-electrolyte mixture between the respective unit of the fuel cell battery element and its coordinated unit storage tank for the fuel-electrolyte mixture.

Fresh fuel-electrolyte mixture 1 from storage feed container 2 is fed over metering device 3 and line 7 to the first unit storage tank 30 making up the first step of the cascade. The remaining unit storage tanks 31, 32, 33, 34 and 35, respectively, making up the remaining steps of the cascade are interconnected by one each of overflow tubes 8 as shown. The electrochemically exhausted mixture from the last step of the cascade in unit storage tank 35 overflows into tube 9 from where it flows into container 11 to be collected therein as exhausted mixture 10. During the operation all unit storage tanks 30, 31, 32, 33, 34 and 35, respectively, are filled with the fuel-electrolyte mixture, whereby the concentration thereof decreases as it passes down to the lower unit storage tanks making up the cascade.

In the embodiment of FIG. 2 of the fuel cell battery it is important, for achieving truoble-free flow of the fuel-electrolyte mixture from step to step in the cascade, that the unit storage tanks 30, 31, 32, 33, 34 and 35, respectively, including the circulatory system associated to each tank or step are arranged one above the other, whereby the first step has the top position and the last step of the cascade has the lowermost position. In this manner, gravity can be utilized for the provision of the fuel-electrolyte mixture to the individual steps of the cascade and to the individual elements of the fuel cell battery, respectively.

It is, however, also possible to arrange the elements of the fuel cell battery and the coordinated tanks 30, 31, 32, 33, 34 and 35, respectively, in side by side fashion but still in different levels. In this case, the overflow tubes 8 are arranged in such manner that there is a differential in the level of each of the tanks for the provision of gravity induced flow. It is also possible to provide all the tanks 30, 31, 32, 33, 34 and 35 and the coordinated fuel cell battery elements side by side on one level. In this case, the cascading of the liquid fuel-electrolyte mixture is effected by pumps, one each in each of connecting tubes 8. Also a combination of gravity induced and forced cascading is possible.

With both embodiments of the fuel cell battery of the invention, the metered addition of the fresh fuel-electrolyte mixture 1 through metering device 3 is controlled in such manner that the required voltage $U_k$ at flowing current J remains constant within certain predetermined limits. One can use the voltage $U_k$ of the battery or, if desired, the voltage of the last battery element for controlling the metering device 3.

During the operation, the fuel-electrolyte mixture is in each step circulated by pump 37, between the unit storage tank 30, 31, 32, 33, 34 and 35, respectively, and the coordinated fuel cell battery element 24, 25, 26, 27, 28 and 29, respectively. The rate of forwarding the liquid by each of pumps 37 is controlled thereby in such manner that the heat generated in each step can be removed in each step by the coordinated heat exchanger 36.

When the arrangement of the fuel cell battery of the invention delivers electrical work, the concentration of the fuel-electrolyte mixture gradually decreases in each step. At the same time the overall voltage of the arrangement decreases, until finally a predetermined lower limit value is reached. At this point, the voltage actuates the metering device 3, permitting the flow of a metered quantity of fresh fuel-electrolyte mixture into the first step and through the liquid cascade. As the fresh mixture works its way through the cascade, the fuel concentration will be increased in each step, resulting in a gradual increase of the voltage. When the voltage reaches an upper predetermined limit, closure of the metering device is effected. As the concentration of the fuel decreases in all steps, as the result of the consumption of current, the voltage of the arrangement drops again. When the lower limit value is reached, the metering device is again actuated into delivering fresh fuel-electrolyte mixture to the first step of the cascade. These cycles repeat themselves over and over again. The cycle is, as is readily apparent, not affected by the increase of the volume of the fuel-electrolyte mixture in the liquid cascade as a result of the formation of the reaction products.

Figure 3:
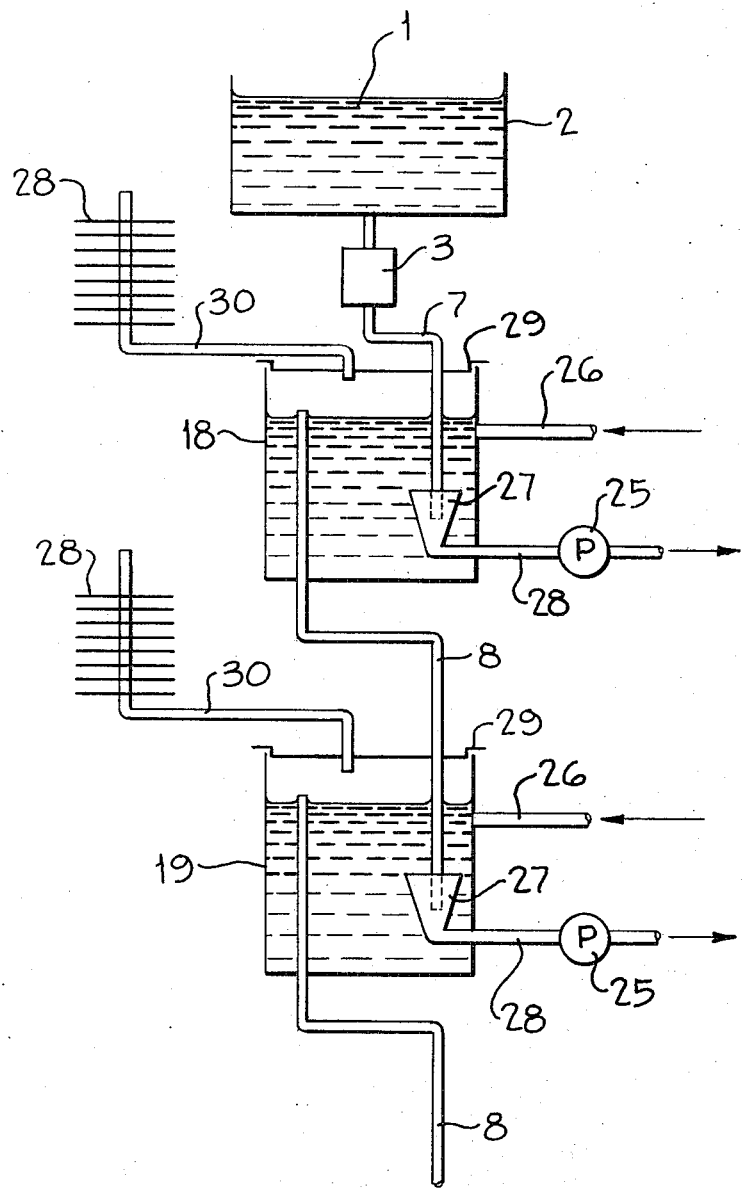
FIG. 3 is an enlarged view of part of the arrangement of FIG. 2, showing in addition funnel shaped suction heads and lids and reflux coolers for the individual unit storage tanks.

Another embodiment of the arrangement of a fuel cell battery in accordance with the invention is illustrated in FIG. 3. In order to achieve maximum supply of the battery unit with the fuel-electrolyte mixture, the ends of feed tube 7 and of the overflow tubes 8, respectively, are arranged within a funnel shaped suction head 47. The funnel shaped suction head 47 is connected to suction line 39, which over pump 37 supplies the battery unit coordinated thereto with the fuel-electrolyte mixture from each of the coordinated unit storage tanks 30, 31, 32, 33, 34 and 35, respectively.

The above described arrangement of the fuel cell battery units has the advantage that the various steps of the cascade are electrolytically not coupled. Since each battery step or unit has its own circulatory system for the fuel-electrolyte mixture, electrical loss currents between the battery steps cannot occur. This applies also to the time periods at which fresh fuel-electrolyte mixture is metered into the cascade system.

Furthermore, the steps of a vertically stacked cascade are not coupled hydrostatically. This means that each of the oxygen electrodes of the fuel cell battery of the invention can be operated at the optimum differential pressure. The unit storage tanks permit also in a simple manner to degas the circulated fuel-electrolyte mixture in each step of the battery.

A further advantage is that the operating temperature of the fuel cell element battery of the invention is reached relatively quickly because there is no need to heat up the full supply 1 of fuel-electrolyte mixture prior to the operation, but only the relatively small volume of liquid need be heated that is comprised in the liquid cascade.

If higher operating temperatures are used, especially if such fuels are used which have a relatively high vapor pressure, the unit storage tanks 30, 31, 32, 33, 34 and 35, respectively, are covered by a lid 49, so that the evaporated portions of the fuel do not escape. The lid 49 is preferably connected by tubing 50 with reflux cooler 48. The reflux cooler 48 is held to a correspondingly low temperature, so that the evaporated fuel is condensed in the cooler, from where it is led back into the respective unit storage tank 30, 31, 32, 33, 34 or 35, respectively.

Figure 4:
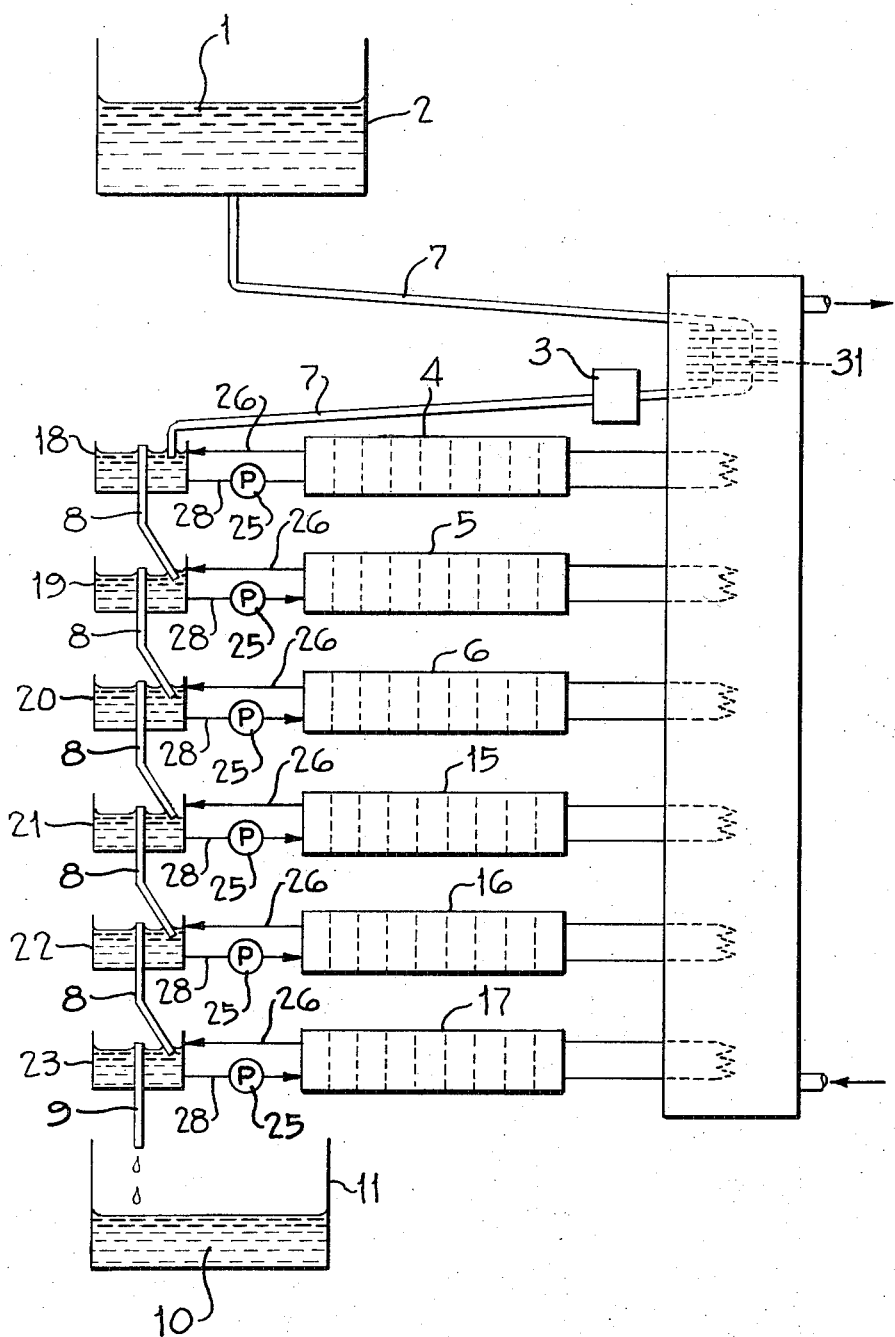
FIG. 4 is similar to FIG. 2, showing in addition preheater or temperature conditioning means for the fresh fuel-electrolyte mixture, coordinated to the feed means and temperature controlled by the heat exchanger device.

In the event that the temperature of the fuel-electrolyte mixture 1 in feed storage container 2 is substantially different from the operating temperature in the arrangement of the fuel cell element battery of the invention, it is desirable to preheat the portions of the fuel-electrolyte mixture 1 which are added to the unit storage tank 30 prior to their addition. This can be achieved, in accordance with FIG. 4, by the provision of a temperature conditioning system 31, which is operated by the heat exchanger 36. This measure assures that the fuel cell element of the first step is always operated under constant, predetermined operating conditions. This means, the fuel-electrolyte mixture in the first step is neither cooled down nor heated up as fresh fuel-electrolyte mixture is added to the first unit storage tank 30.

What is claimed is:

1. A liquid fuel cell battery arrangement comprising:
   a plurality of individual circulating systems for fuel-electrolyte mixture, each system including a separate fuel cell battery element, a separate associated individual storage tank for said mixture, and means for circulating said mixture from said tank through said associated battery element and back into the same storage tank;
   means for introducing fuel-electrolyte mixture from outside said circulating systems into one of said individual storage tanks;
   means for cascading said mixture consecutively through all of said individual storage tanks, said cascading means comprising a separate overflow pipe connecting each storage tank to the next, each overflow pipe having its inlet positioned to establish a predetermined overflow level in one tank, and its outlet positioned below the predetermined overflow level in the next cascade tank; and
   means for controlling the flow of said mixture through said introducing means to regulate the electrical output from said arrangement.

2. The battery arrangement of claim 1, wherein each said circulating system further includes a separate heat exchanger means for controlling the temperature of the fuel cell battery element forming part of the same circulating system.

3. The battery arrangement of claim 1, wherein each tank has a gas space above its overflow level, and a gas vent leading out of said gas space.

4. The battery arrangement of claim 3, wherein each said gas vent is equipped with condensing means for condensing evaporated electrolyte mixture and returning same to the tank vented thereby.

5. The battery arrangement of claim 1, wherein each said circulating system has a funnel-shaped inlet positioned below the overflow level in the associated storage tank, and an outlet terminating outside said funnel, and wherein the pipe introducing mixture into said tank from outside said system terminates within said funnel.

References Cited
UNITED STATES PATENTS

| | | | |
|---|---|---|---|
| 3,256,116 | 6/1966 | Justi et al. | 136—86 E |
| 3,316,161 | 4/1967 | Jung et al. | 136—86 E |
| 3,443,999 | 5/1969 | Fukada et al. | 136—86 R |

ALLEN B. CURTIS, Primary Examiner

H. A. FEELEY, Assistant Examiner

U.S. Cl. X.R.

136—86 R